United States Patent  [15] 3,658,280
McDonnell  [45] Apr. 25, 1972

[54] ALTITUDE AND GLIDE SLOPE TRACK CONTROLLER

[72] Inventor: John D. McDonnell, Inglewood, Calif.
[73] Assignee: McDonnell Douglas Corporation, Santa Monica, Calif.
[22] Filed: Oct. 29, 1970
[21] Appl. No.: 84,989

[52] U.S. Cl. .................................................. 244/77 D
[51] Int. Cl. ..................................................... B64c 13/50
[58] Field of Search ........................... 244/76 C, 77 D, 77 R

[56] References Cited

UNITED STATES PATENTS 2,943,823   7/1960   Mullins et al. ........................ 244/77 D Primary Examiner—Richard E. Aegerter
Assistant Examiner—Douglas D. Watts
Attorney—Walter J. Jason, Donald L. Royer and D. N. Jeu

[57] ABSTRACT

Aircraft flight control system providing rapid aircraft responses when controlling aircraft altitude, glide slope tracking and flare by the coordinated and combined use of spoilers and elevators in a closed loop control system. The system utilizes both spoiler-generated direct lift and elevator-generated lift due to rotation wherein the spoilers provide immediate changes in aircraft normal acceleration in response to an acceleration command and the elevators provide similar but longer term changes in response to an associated pitch rate command. The closed loop control system includes a common accelerometer feedback path to provide acceleration control through both spoilers and elevators, and a crossfeed path between the spoilers and elevators to cancel undesirable pitching moments produced by the spoilers.

10 Claims, 2 Drawing Figures

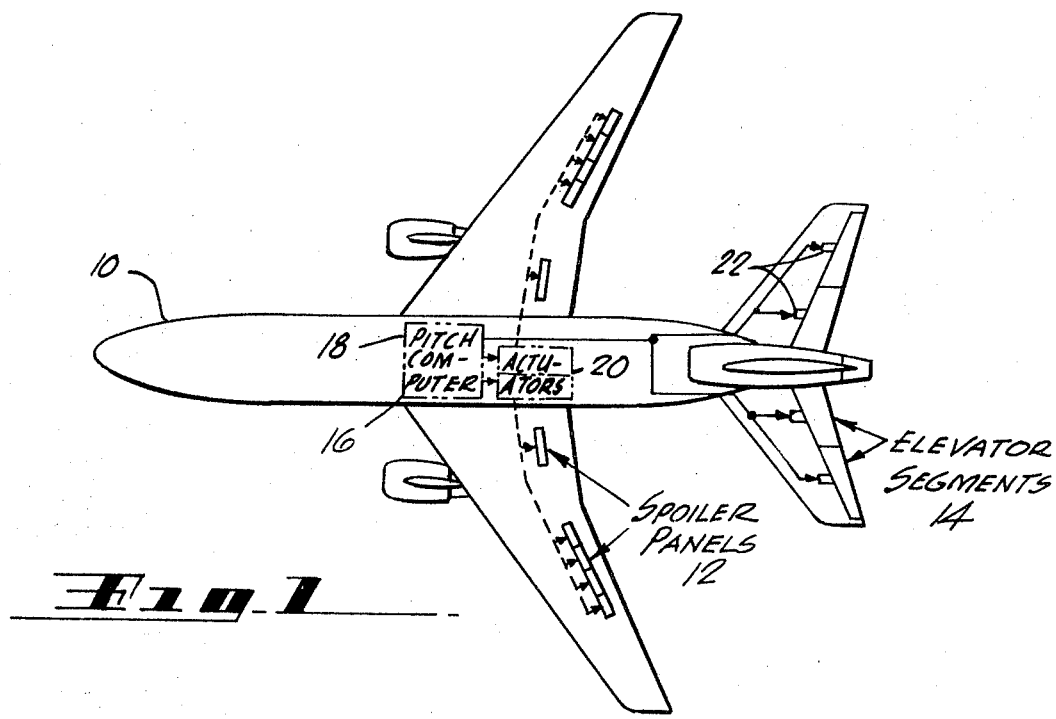
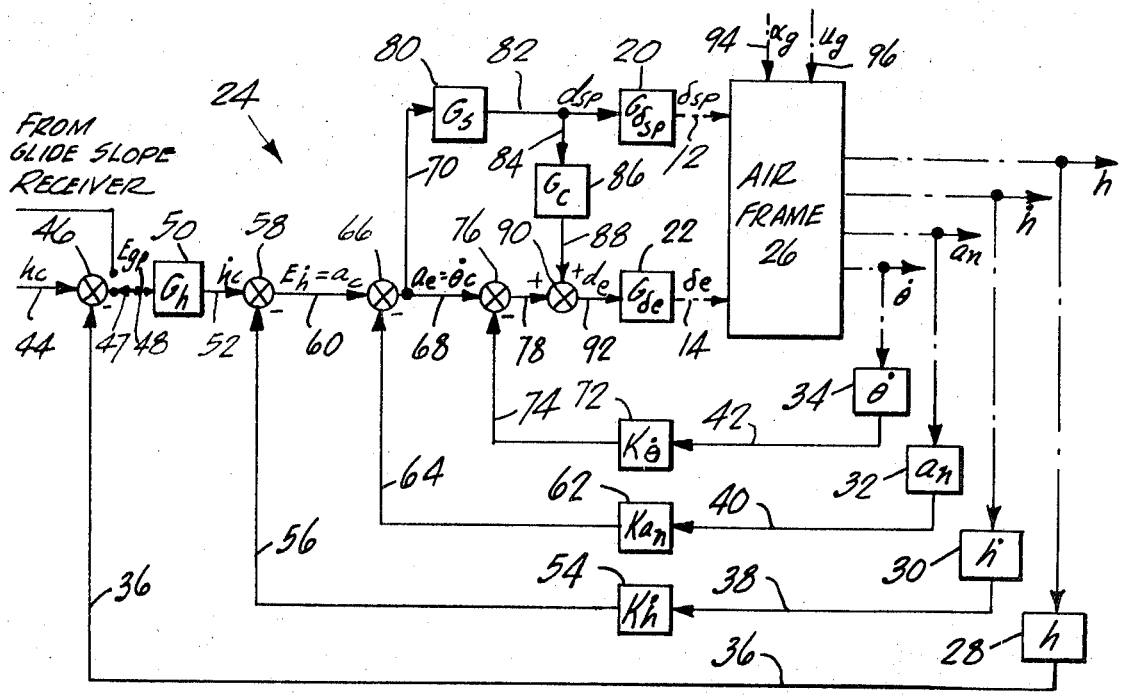

3,658,280

ALTITUDE AND GLIDE SLOPE TRACK CONTROLLER

BACKGROUND OF THE INVENTION

My present invention relates generally to aircraft control systems and more particularly to a highly effective aircraft flight control system which produces rapid aircraft responses to altitude commands of the control system.

As wing loadings and inertias have increased in contemporary aircraft designs, altitude control has become increasingly sluggish and difficult to accomplish with the conventional longitudinal autopilots or control systems. The primary cause of this has been due to the long delay between an elevator input (displacement) and the build-up of vertical forces (lift). The lag in obtaining the desired aircraft rotation to increase its angle of attack makes the delay in lift inevitable. Thus, an immediate increase in lift cannot be obtained with the conventional longitudinal control system because of the rotational inertia of the aircraft. Of course, increased rotational inertias are particularly apparent in the "wide body" series of air transports.

A means of improving the altitude response characteristics of an aircraft with large rotational inertias is available through the use of control surfaces which generate lift forces immediately without any aircraft rotation. Various control systems utilizing such "direct lift" surfaces to supplement the usual rotationally derived lift have been developed and tested in the past. The surfaces utilized to provide direct lift in an aircraft have been the wing flaps, ailerons and similar surfaces. These surfaces are, however, designed primarily for other well-known major functions and their simultaneous use for providing direct lift complicates and detracts from their normal performance.

SUMMARY OF THE INVENTION

Briefly, and in general terms, my invention is preferably accomplished by providing an aircraft flight control system including spoilers and elevators connected in a closed loop system wherein the spoilers provide immediate changes in lift to supplement the slower changes in lift caused by the elevators in response to commands or gusts. The closed loop system includes an altitude rate feedback path, a normal acceleration feedback path and a pitch rate feedback path. A spoiler-to-elevator crossfeed path is also provided in the closed loop system to cancel undesirable pitching moments produced by the spoilers.

The altitude rate feedback signal is algebraically summed with an altitude rate command signal to provide an altitude rate error (acceleration command) signal which is, in turn, algebraically summed with the normal acceleration feedback signal to provide an acceleration error signal. The acceleration error signal is suitably filtered to provide a spoiler command signal which is applied to a spoiler servoactuator that actuates the spoilers to produce direct lift. The acceleration error signal is simultaneously summed algebraically with the pitch rate feedback signal to provide an elevator command signal which is applied to an elevator servoactuator that actuates the elevators to produce lift caused by rotation. The spoiler-generated direct lift supplements the slower elevator-generated lift due to rotation and provides a substantial improvement in performance by significantly reducing the usual time lag required to generate lift in the conventional longitudinal control system.

BRIEF DESCRIPTION OF THE DRAWING

My invention will be more fully understood, and other features and advantages thereof will become apparent, from the description given below of an exemplary embodiment of the invention. This description of the exemplary embodiment is to be taken in conjunction with the accompanying drawing, in which:

FIG. 1 is a top plan view of a wide body aircraft including a flight control system in accordance with this invention, shown in simplified diagrammatic form, which provides superior performance in controlling aircraft altitude, glide slope tracking and flare; and FIG. 2 is a block diagram illustrating a schematic arrangement of the flight control system embodying the present invention.

DESCRIPTION OF THE PRESENT EMBODIMENT

FIG. 1 is a top plan view of a wide body aircraft 10 showing the general arrangement and location of its spoiler panels 12 and elevator segments 14. A flight control system 16 in accordance with my invention is shown in simplified diagrammatic form. The control system 16 includes a pitch computer 18 having electrical output signals which comprise respective spoiler and elevator input signals for (two) spoiler servoactuators 20 and (four) elevator servoactuators 22. The pitch computer 18 is, of course, the pertinent portion of a generally conventional autopilot (the Model PB 100 Bendix Automatic Pilot/Flight Director, for example) with its associated input data. Control column movement by the pilot normally provides the input to control the spoiler servoactuators 20. These servoactuators 20 also accept commands from the pitch computer 18 independently when operating in an automatic control mode. The spoiler servoactuators 20 mechanically control surface actuators located respectively at the spoiler panels 12.

Similarly, control column movement by the pilot normally provides the input to control the elevator servoactuators 22. These servoactuators 22 also accept commands from the pitch computer 18 (autopilot) when operating in an automatic control mode. The usual variable load feel device (not shown) is provided in the elevator longitudinal control system, and the elevator servoactuators 22 are conventional tandem hydraulic actuators as are the spoiler servoactuators 20. All of the autopilot servos are integrated with their respective surface actuators to improve system reliability and provides optimum system response characteristics for autopilot modes of operation. Of course, when the autopilot is engaged, autopilot authority is limited to a safe value and conventional override units are provided to permit the pilot to maintain control over the system as may be required.

FIG. 2 is a block diagram illustrating a schematic arrangement of the closed loop system 24 which receives suitable input signals from the pitch computer 18 (FIG. 1), or more generally, the autopilot. In this arrangement, airframe 26 of the aircraft 10 is the controlled component which forms part of the closed loop system 24. Position and motions of the airframe 26 are sensed by altitude sensor 28, altitude rate sensor 30, normal acceleration sensor 32 and pitch rate sensor 34 to provide altitude $h$, altitude rate $\dot{h}$, normal acceleration $a_n$ and pitch rate $\dot{\theta}$ signals respectively on lines 36, 38, 40 and 42. The altitude signal $h$ can be provided from the usual air data computer, the altitude rate signal $\dot{h}$ can be obtained from a barometric device or suitably derived, the normal acceleration signal $a_n$ can be provided from an inertial accelerometer and the pitch rate signal $\dot{\theta}$ can be provided by a pitch rate gyro, as is well-known in the art.

An altitude command signal $h_c$ which is provided on line 44 from the pitch computer 18 is algebraically summed with the altitude signal $h$ on the line 36 by summing device 46 to provide an altitude system error signal $E_{ap}$ on line 48. By selecting and coupling the output of the usual glide slope receiver (not shown) with switch 47 to line 48, a glide slope error signal $E_{ap}$ can also be obtained. This altitude or glide slope error signal $E_{ap}$ on line 48 is applied to an altitude or glide slope error filter (and gain) device 50 having a transfer function $G_h$ to provide an altitude rate command signal $\dot{h}_c$ on line 52. The altitude rate signal $\dot{h}$ on line 38 is applied to altitude rate gain device 54 having a gain $K'_h$ to provide an amplified output signal on line 56, which is algebraically summed with the altitude rate command signal $\dot{h}_c$ on line 52 by summing device 58 to provide an altitude rate error signal $E_{\dot{h}}$ on line 60. This error signal $E_{\dot{h}}$ is the acceleration command signal $a_c$.

The normal acceleration signal $a_n$ on line 40 is applied to acceleration gain device 62 having a gain $K_{a_n}$ to provide an amplified output signal on line 64, which is algebraically summed with acceleration command signal $a_c$ on the line 60 by summing device 66 to provide an acceleration error signal $a_e$ on lines 68 and 70. This error signal $a_e$ is the pitch rate command signal $\dot{\theta}_c$. The pitch rate signal $\dot{\theta}$ on line 42 is applied to pitch rate gain device 72 having a gain $K\dot{\theta}$ to provide an amplified output signal on line 74, which is algebraically summed with the pitch rate command signal $\dot{\theta}_c$ on line 68 by summing device 76 to provide an output signal on line 78.

The acceleration error signal $a_e$ on line 70 is applied to spoiler command filter (and gain) device 80 having a transfer function $G_s$ to provide a spoiler command signal $d_{sp}$ on line 82. The transfer function $G_s$ has the form $K_dS/(T_1S+1)(T_2S+1)$, where S and T are the conventional symbols for the Laplace operator and time constant of a circuit, respectively. The command signal $d_{sp}$ on line 82 is applied to spoiler servoactuator 20 having a transfer function $G_{\delta sp}$ to drive the spoilers 12 (FIG. 1) to a spoiler position $\delta_{sp}$. The command signal $d_{sp}$ is also applied on line 84 to spoiler-to-elevator crossfeed filter device 86 having a transfer function $G_c$ to provide an output signal on line 88.

The output signal on line 78 from the summing device 76 and the output signal on line 88 from the crossfeed filter device 86 are algebraically summed by the summing device 90 to provide an elevator command signal $d_e$ on line 92. This command signal $d_e$ is applied to the elevator servoactuator 22 to drive the elevators 14 (FIG. 1) to an elevator position $\delta_e$. The crossfeed filter device 86 operates to cancel undesirable pitching moments produced by the spoilers 12. In the absence of an altitude command signal input ($h_c = 0$), the closed loop system 24 minimizes aircraft response to atmospheric turbulances and rapidly reduces any system error signal $E_{gp}$ to zero in a manner superior to other autopilot systems. A vertical wind gust $\alpha_g$ and longitudinal wind gust $u_g$ are respectively indicated by lines 94 and 96 in FIG. 2 as acting on the airframe 26.

Operation of the closed loop system 24 shown in FIGS. 1 and 2 can be described by considering system response to an altitude command input signal $h_c$ and in the presence of turbulence. Assume that the aircraft 10 is proceeding in level or descending trimmed flight and that an altitude command signal $h_c$ is applied or, alternatively, a glide slope or system error signal $E_{gp}$ is applied. The system 24 will respond so as to reduce the system error signal $E_{gp}$ to zero in the shortest possible time. This is accomplished by:

1. Filtering the system error signal $E_{gp}$ by filter (and gain) device 50 and then using it to command an altitude rate ($\dot{h}_c$) in the proper direction to reduce the system error ($E_{gp}$).
2. The resulting altitude rate error signal $E_{\dot{h}}$ is used to command a normal acceleration ($a_c$) in the proper direction to reduce the altitude rate error ($E_{\dot{h}}$).
3. The acceleration command signal $a_c$ is processed to obtain the proper acceleration immediately through the spoilers 12 which generate acceleration directly, and a longer term acceleration through the elevators 14 which are responsive to a pitch rate command signal $\dot{\theta}_c$. The common feedback path including the acceleration gain device 62 operates so that the desired acceleration ($a_c$) is obtained immediately and remains proportional to the altitude rate error ($E_{\dot{h}}$).
4. The acceleration command ($a_c$) will persist until altitude rate error ($E_{\dot{h}}$) is returned to zero, and the altitude rate error will persist until the glide slope or system error ($E_{gp}$) is returned to zero. The filtering accomplished in each of the branches of the closed loop system 24 is adjusted to give adequate system damping and speed of response, as well as complementary behavior between the short term acceleration obtained through the spoilers 12 and the long term acceleration obtained through the elevators 14 driven by the commanded pitch rate ($\dot{\theta}_c$). The result is a faster responding system than has been experienced with any previous aircraft autopilot systems.
5. The crossfeed filter device 86 provided between the spoiler and elevator servoactuators 20 and 22 acts to modify the elevator command signal $d_e$ applied to the elevator servoactuator to cancel undesirable pitching moments produced by the spoilers 12.

Assume now that the aircraft 10 is in level trimmed flight with all errors nulled. If the aircraft 10 is then acted upon by a vertical wind gust $\alpha_g$, the following occurs:

1. The aircraft 10 will begin to accelerate upwards; i.e., a positive normal acceleration signal $a_n$ is produced.
2. The common acceleration feedback path including the acceleration gain device 62 will produce acceleration error signals $a_e$ and $\dot{\theta}_c$ respectively for the spoiler and pitch rate branches or loops.
3. The spoiler acceleration error ($a_e$) produces a spoiler deflection which accelerates the aircraft 10 downwards. After an elaspsed time determined by the spoiler command filter (and gain) device 80, the spoilers 12 begin to return to their nominal position (called "washing out").
4. At the same time, the pitch rate ($\dot{\theta}$) occurring from the pitch rate command signal $\dot{\theta}_c (= a_e)$ feeding the pitch rate loop is causing a downward acceleration build-up due to rotation just as the spoiler-produced acceleration is decreasing.
5. When the commanded acceleration ($a_c$) is attained; i.e., when $a_e = 0$, the pitch rate command is also removed ($\dot{\theta}_c = 0$) and the aircraft 10 will remain at its new correct pitch attitude ($\theta$) without having the requirement for pitch-trim integration to establish the new correct attitude, as would be required in a conventional pitch reference autopilot system. Without the requirement to "retrim" pitch in the presence of wind shear, the aircraft response is much faster and significantly more accurate.
6. The effect of combining these two sources of acceleration is that as the immediate change in normal acceleration from the spoilers 12 is decreasing, angle of attack changes begin to produce acceleration so that the total aircraft acceleration characteristics are "speeded up" and the displacement caused by the vertical wind gust $\alpha_g$ is reduced well beyond that attainable with autopilots of previous characteristics.

The transfer function $G_s$ of the spoiler command filter (and gain) device 80 was illustratively indicated earlier above. In the exemplary embodiment of this invention, the transfer functions of the gain and filter devices 50, 54, 62, 72, 80 and 86 are respectively as follows:

$$G_h = 0.5 \; \frac{\text{ft./sec.}^2 \; a_e}{\text{ft.}}$$

$$K_{\dot{h}} = 1.5 \; \frac{\text{ft./sec.}^2 \; a_e}{\text{ft./sec.}}$$

$$K_{an} = 1.25 \; \frac{\text{ft./sec.}^2 \; a_e}{\text{ft./sec.}^2}$$

$$K_{\dot{\theta}} = 3 \; \frac{\text{deg. elevator}}{\text{deg./sec.}}$$

$$G_s = \frac{8S}{(S+1)(2S+1)} \; \frac{\text{deg. spoiler}}{\text{ft./sec.}^2 \; a_e}$$

$$G_c = 2 \; \frac{\text{deg. elevator}}{\text{deg. spoiler}}$$

The acceleration error signal $a_e$ point in the closed loop system 24 was chosen above as a reference. With device 50, a one foot glide slope or system error input thereto is translated into an acceleration error signal $a_e$ of $$0.5 \; \frac{\text{ft./sec.}^2}{\text{ft.}}$$

for example. Also, as further examples and for illustrative purposes only, the transfer functions of the spoiler and elevator servoactuators 20 and 22 are respectively as follows:

$$G_{\delta sp} = \frac{100}{S^2 + 14S + 100} \quad \frac{\text{deg. spoiler}}{\text{deg. command}}$$

$$G_{\delta e} = \frac{100}{S^2 + 14S + 100} \quad \frac{\text{deg. elevator}}{\text{deg. command}}$$

While an exemplary embodiment of this invention has been described above and shown in the accompanying drawing, it is to be understood that such embodiment is merely illustrative of, and not restrictive on, the broad invention and that I do not desire to be limited in my invention to the details of construction or arrangement shown and described, for obvious modifications will occur to persons skilled in the art.

What is claimed is:

1. In an aircraft including a spoiler and an elevator, a flight control system comprising:
    a spoiler branch including spoiler control means for driving said spoiler;
    an elevator branch including elevator control means for driving said elevator;
    means for providing an acceleration command signal;
    a normal acceleration feedback path including means for sensing normal acceleration of said aircraft and providing a normal acceleration signal therefrom;
    means for algebraically summing said acceleration command signal and said normal acceleration signal to provide an acceleration error signal;
    means for applying said acceleration error signal to said spoiler branch to drive said spoiler, said spoiler being driven to provide a direct lift to said aircraft;
    a pitch rate feedback path including means for sensing pitch rate of said aircraft and providing a pitch rate signal therefrom;
    means for algebraically summing said acceleration error signal and said pitch rate signal to provide a pitch rate error signal; and
    means for applying said pitch rate error signal to said elevator branch to drive said elevator, said elevator being driven to provide rotation-caused lift to said aircraft whereby the spoiler-generated direct lift complements the elevator-generated lift due to rotation and said acceleration error and pitch rate error signals are reduced to zero.

2. The invention as defined in claim 1 wherein said spoiler control means includes washout means for returning said spoiler to its nominal position after a predetermined elapsed time following actuation thereof.

3. The invention as defined in claim 1 further comprising a crossfeed path between said spoiler and elevator branches, said crossfeed path including means for canceling undesirable pitching moments produced by said spoiler.

4. The invention as defined in claim 1 wherein said acceleration command signal is an altitude rate error signal, and said means for providing said altitude rate error signal includes:
    means for providing a system error signal;
    means for providing an altitude rate command signal from said system error signal;
    an altitude rate feedback path including means for sensing altitude rate of said aircraft and providing an altitude rate signal therefrom; and
    means for algebraically summing said altitude rate command signal and said altitude rate signal to provide said altitude rate error signal.

5. The invention as defined in claim 4 wherein said system error signal is a glide slope error signal.

6. The invention as defined in claim 5 wherein said spoiler control means includes washout means for returning said spoiler to its nominal position after a predetermined elapsed time following actuation thereof.

7. The invention as defined in claim 5 further comprising a crossfeed path between said spoiler and elevator branches, said crossfeed path including means for canceling undesirable pitching moments produced by said spoiler.

8. The invention as defined in claim 4 wherein said means for providing a system error signal includes:
    means for providing an altitude command signal;
    an altitude feedback path including means for sensing altitude of said aircraft and providing an altitude signal therefrom; and
    means for algebraically summing said altitude command signal and said altitude signal to provide said system error signal.

9. The invention as defined in claim 8 wherein said spoiler control means includes washout means for returning said spoiler to its nominal position after a predetermined elapsed time following actuation thereof.

10. The invention as defined in claim 9 further comprising a crossfeed path between said spoiler and elevator branches, said crossfeed path including means for canceling undesirable pitching moments produced by said spoiler.

* * * * *